WALTER DAMSKY, SIEGFRIED JOISTEN, JANOS SAJBEN

United States Patent Office 3,608,144
Patented Sept. 28, 1971

3,608,144
APPARATUS FOR THE CONTINUOUS PRODUCTION OF PRECISION PROFILES FROM PLASTICS
Walter Damsky and Siegfried Joisten, Krefeld, and Janos Sajben, Krefeld-Gartenstadt, Germany, assignors to Farbenfabriken Bayer Aktiengesellschaft, Leverkusen, Germany
Filed May 1, 1968, Ser. No. 725,771
Claims priority, application Germany, May 5, 1967, F 52,322
Int. Cl. B29f 3/00
U.S. Cl. 18—12R                                    7 Claims

ABSTRACT OF THE DISCLOSURE

Apparatus for producing a plastic extruded article having a precision cross-sectional profile. The apparatus comprises an extruder having a fusion section, a cooling section and a die section. The die section imparts to the extrusion a predetermined cross-sectional profile greater than that ultimately desired. Also included is a cavity cutting tool provided with a plurality of spaced cutting units, positioned adjacent the extruder so as to embrace the extrusion in its path leaving the extruder, and to cut down the oversized profile to the desired precision profile.

---

Figure 1:
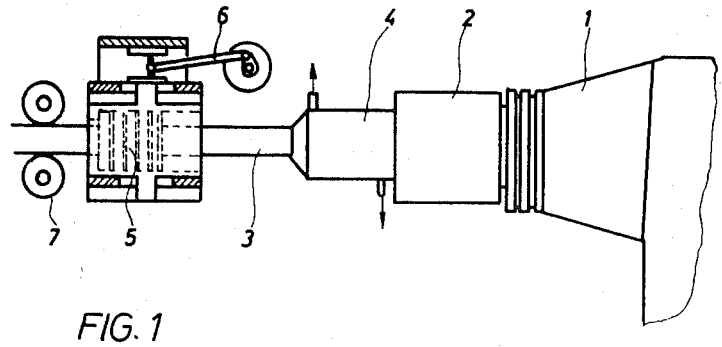

A method of and an apparatus for the continuous production of precision profiles from plastics, for example from polyamides, acetal resins or polycarbonates by extrusion.

It is generally known in the art that precision profiles can be produced from metals by casting or extrusion. In recent years, this process has been used to an ever-increasing extent for plastics. The technological properties of plastics, however, give rise to difficulties in obtaining sufficient precision in the shape and dimensions of profiles produced from plastics, for example, in the form of rails, such as guide rails for drawers, slide rails for curtains, and sections for structural components. In many instances, the precision obtained with casting or extrusion falls short of requirements with the result that, in the case of guide rails in particular, the object guided by them can either jam or tilt.

In a conventional process for producing profiles, extrusion is carried out as known in the art and the material emerges from an extruder or supply container through a forming nozzle or die which at the same time may be designed to function as a precision extrusion die, or alternatively an extrusion die may be joined on to the outlet nozzles. Unlike metals, plastics can undergo considerable deformation, even after they have passed through precision extrusion dies, because with plastics the influence of shrinkage and structural orientation is much greater and lasts longer.

For this reason, the technique of machining commonly used in metal work has been adopted for precision sections in that the sections are produced from blanks by planing, milling or shaping. The sections or profiles produced in this way, however, are relatively short in length because the machines by which they are worked are generally not suitable for handling endless profiles. Accordingly, this method of production is highly uneconomic because, on the one hand, it can only be used for special components and, on the other hand, the sections have to be produced from blanks, with consequent wastage of material.

It has now been found that endless profiles can be produced with the requisite precision by a process in which the extruded profiles are guided through a rough-gauge oversize die and, immediately when they have hardened, are passed through a multi-stage cavity cutting tool in which they are machined.

Accordingly, this process embodies an appreciable advance in the production of precision profiles from plastics because the rough-gauge preforming stage limits the profile in the degree in which it is oversize, to such an extent that on entering the cutting tool there is still enough excess, allowing for intermediate contraction or distortion, for all the important surfaces of the profile to be fully dealt with during machining.

The apparatus for carrying out the process according to the invention is distinguished by the fact that the extrusion die is overgauge and is followed by a multi-stage cavity cutting tool. In addition to conventional cutting tools commercially available for this purpose, a newly developed cutting tool has proved to be particularly suitable for this purpose. It has a housing as known in the art in which several cutting units are arranged one behind the other, each unit comprising a cutting blade and a spacer member. In conventional cutting units, an insert integral with the actual cutting element was used as the spacer member before the next cutting unit. The particular advantage according to the invention of the separation into cutting blade and spacer member is that the cutting blades are much easier to produce, because the thinner they are, the more effective the cutting edges can be made. The spacer member preferably comprises a supporting profile for the cutting edges of the cutting blades in order to support them. The cutting blades and spacer members are with advantage prevented from rotating, for example by means of a fitting key. Both the spacer members and the housing have matching openings so that chips accumulating in the gaps between the cutting blades can be removed, for example in the cooling liquid used, or by means of a reduced pressure. The cutting speed may with particular advantage be increased by adapting the cutting tool in such a way that it can be reciprocated in the cutting direction by means of a drive. In order to avoid time losses, the return stroke can be completed at greater speed than the cutting stroke, as it is planing machines. This measure is of particular importance to profiles which emerge very slowly from the extruder, in order to maintain a necessary minimum cutting speed. For example, the discharge speed of a polyamide profile with a diameter of 60 to 100 mm. is only some 5 to 50 mm./min. At speeds as low as these, it is of course impossible to obtain smooth clean cuts with a fixed cutting tool.

It has also been found that in the case of circular profiles or profiles whose surface to be machined is fairly wide and continuous, the cutting edges of equal size can be more effectively distributed on several adjacent cutting blades by using each cutting blade to treat only part of the width of the profile, in which case the cutting edges of the individual cutting blades are offset relative to one another so that narrow chips are formed. In order to guide the profile to be machined, the cutting tool is provided with a centering means at its inlet end and if required at its outlet end, too.

One embodiment of the apparatus according to the invention is described in the following with reference to the accompanying drawing, wherein:
  FIG. 1 shows the apparatus as a whole and
  FIG. 2 the multistage cavity cutting tool.

Referring now to FIG. 1, a plastics material is fused in an extruder 1 and a profile 3 is preformed in a mold 2, somewhat oversize in order to allow for contraction. The profile 3 solidifies in a following cooling section 4 and passes through a multi-stage cavity cutting tool 5 which can be reciprocated by means of a drive 6. Rolls 7 provide a take-off system.

Figure 2:
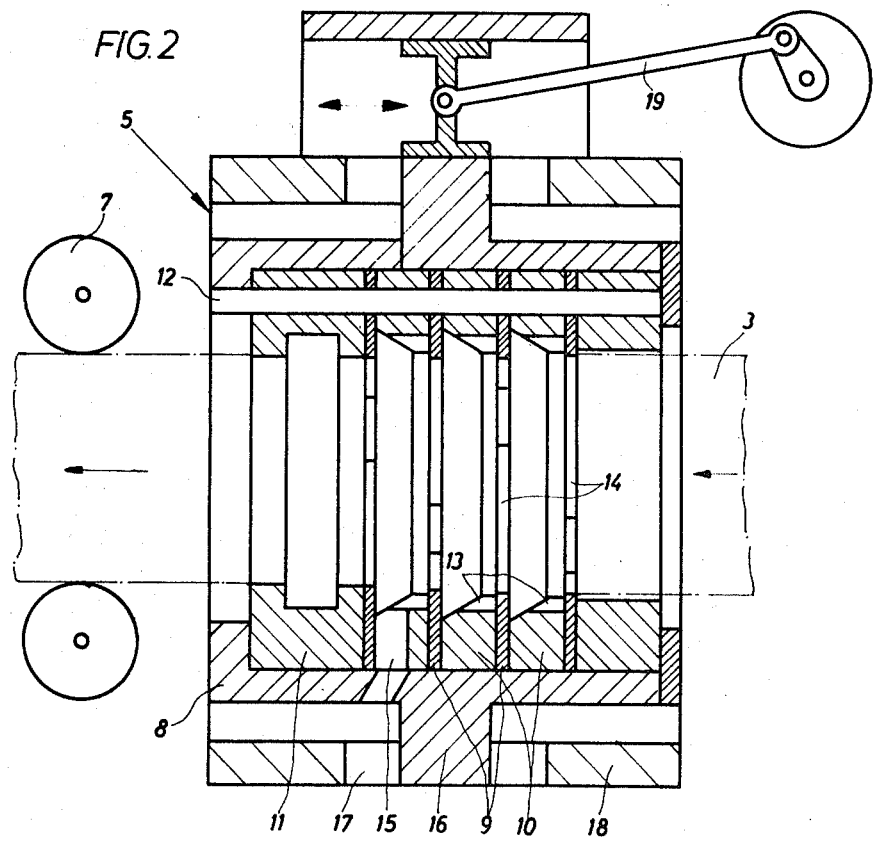

In FIG. 2, the profile 3 passes through the multi-stage cavity cutting tool 5 and is carried off by the take-off system 7. The cutting tool 5 comprises a housing 8, cutting blades 9, spacers 10 and centering pieces 11. These components are prevented from rotating by means of bolt 12. The spacers 10 have supporting profiles 13 for the cutting edges 14 of the cutting blades 9, and openings 15 through which the cuttings are removed. Corresponding openings 15 are also provided in the housing 8. The housing 8 is provided with guide studs 16 on which it slides in slots 17 of a guide housing 18, when the tool is reciprocated by means of a crank drive 19.

We claim:

1. An apparatus for producing a plastic extruded article having a precision cross-sectional profile, comprising in combination:
 an extruder having a fusing section, a cooling section and a die section, said die section imparting to the extrusion a predetermined cross-sectional profile greater than ultimately desired, and
 a cavity cutting tool positioned adjacent said extruder so as to embrace the extrusion and to cut down the oversize profile to the desired precision profile, said cutting tool comprising:
  a multiple of cutting units, each distal-proximate and axially aligned one behind the other;
  a multiple of spacers inserted between said cutting units;
  a housing with means disposed for attaching and providing a rigidly fixed position for said cutting units and said spacers;
  means for centering said housing containing said cutting units and said spacers for precision machining a longitudinally juxtaposed oversized profile of the plastic extrusion; and
  means for reciprocating said housing longitudinally of the profile of the plastic extrusion.

2. An apparatus as claimed in claim 1, wherein said spacers are of similar profile as said cutting blades for supporting the cutting edges of said cutting blades.

3. An apparatus as claimed in claim 1, wherein said means for providing a rigidly fixed position comprises a bolt extending through said housing for preventing rotation of said cutting units and said spacers.

4. An apparatus as claimed in claim 1, wherein said housing and said spacers have similarly aligned apertures for discharging cuttings of the plastic extrusion.

5. An apparatus as claimed in claim 1, wherein said reciprocating means comprises:
 a bell crank drive;
 a valve fixedly attached to said housing;
 a chamber guidably and slideably containing said valve, said chamber having a slotted opening through which said housing is fixedly attached to said valve;
 means for driving said valve, connected to said housing, forward and backward within said chamber; and
 means for rotating said bell crank drive for reciprocating motion of said housing connected to said valve.

6. An apparatus as claimed in claim 1, wherein means for centering comprises a spacer having an opening centrally located with respect to the plastic extrusion for holding said housing centrally relative to the longitudinally axial alignment of the profile of the plastic extrusion to be machined.

7. An apparatus for producing a plastic extruded article having a precision cross-sectional profile, comprising in combination:
 an extruder having a fusing section, a cooling section and a die section, said die section imparting to the extrusion a predetermined cross-sectional profile greater than ultimately desired, and
 a cavity cutting tool provided with a plurality of cutting units, said tool being positioned adjacent said extruder so as to embrace the extrusion and to cut down the oversize profile to the desired precision profile, and including a plurality of spacers between said cutting units, a housing for said cutting units and spacers, and means for fixing the position of said cutting units and said spacers in said housing.

References Cited

UNITED STATES PATENTS

| | | | |
|---|---|---|---|
| 2,452,884 | 11/1948 | Werner | 18—12X |
| 2,294,555 | 9/1944 | Hendrie | 18—12X |
| 3,241,182 | 3/1966 | Kessler | 18—12 |
| 3,454,693 | 7/1969 | Crenshaw. | |
| 2,688,400 | 9/1954 | Ansel | 72—254 |

ANDREW R. JUHASZ, Primary Examiner

L. GILDEN, Assistant Examiner

U.S. Cl. X.R.

18—14A